United States Patent
Tam et al.

(10) Patent No.: US 7,337,305 B2
(45) Date of Patent: Feb. 26, 2008

(54) METHOD AND PIPELINE ARCHITECTURE FOR PROCESSING MULTIPLE SWAP REQUESTS TO REDUCE LATENCY

(75) Inventors: Kenway W. Tam, Cupertino, CA (US); Shree Kant, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 356 days.

(21) Appl. No.: 10/721,300

(22) Filed: Nov. 24, 2003

(65) Prior Publication Data

US 2005/0114634 A1    May 26, 2005

(51) Int. Cl.
*G06F 9/315* (2006.01)
(52) U.S. Cl. .............. 712/218; 712/219; 712/225; 712/228
(58) Field of Classification Search ........ 712/225, 712/219, 218, 216, 229, 228, 226; 718/108
See application file for complete search history.

(56) References Cited

U.S. PATENT DOCUMENTS

| | | | | |
|---|---|---|---|---|
| 4,831,623 A | * | 5/1989 | Terzian ............ | 714/724 |
| 5,634,118 A | * | 5/1997 | Blomgren ......... | 712/226 |
| 5,819,060 A | * | 10/1998 | Cesana ............ | 712/219 |
| 6,549,442 B1 | * | 4/2003 | Lu et al. .......... | 365/49 |

OTHER PUBLICATIONS

Hennessy et al, Computer Architecture: A Quantitative Approach, 1996, Morgan Kaufmann Publishers, Inc., 2nd Edition, p. 96-108, 139-161, 187-199, and 221-240.*

* cited by examiner

*Primary Examiner*—Tonia L. Meonske
(74) *Attorney, Agent, or Firm*—Martine Penilla & Gencarella, LLP

(57) ABSTRACT

A system and method of processing multiple swap requests including receiving a first swap request in a pipeline and executing the first swap request. A second swap request is also received in the pipeline immediately following the first swap request. The first swap request and the second swap request are examined to determine if the first swap request and the second swap request swap a same register.

14 Claims, 4 Drawing Sheets

METHOD AND PIPELINE ARCHITECTURE FOR PROCESSING MULTIPLE SWAP REQUESTS TO REDUCE LATENCY

BACKGROUND OF THE INVENTION

1. Field of the Invention

The present invention relates generally to processing pipelines in a pipeline processor, and more particularly, to methods and systems for more efficiently processing swap operations.

2. Description of the Related Art

Microprocessors have used pipelines to organize processing of multiple instructions simultaneously. A pipeline processor can begin executing a second instruction before the first (preceding) instruction has been completed. Similarly, several instructions can be held in the pipeline simultaneously, each instruction being at a different processing stage (e.g, read, write, compare, calculate, etc.).

The pipeline is typically divided into segments and each segment can execute its operation concurrently with the other segments. Typically, each when a segment completes an operation, it passes the result to the next segment in the pipeline and fetches the next operation from the preceding segment. The final results of each instruction emerge at the end of the pipeline in rapid succession.

FIG. 1A shows a typical prior art processing window 100 used by a pipeline processor. The processing window 100 includes some number of register windows 110-117 (e.g., eight register windows reg0-reg7). An active register window 120 is also included. The active register window 120 can be accessed by the processor. By way of example, as the pipeline progresses, the contents of register window 113 will be restored to the active register 120 so that the contents of register window 113 can be processed by the processor. However, typically the active register 120 is not empty and therefore the data in the active register 120 must be saved to the appropriate register window (e.g., register window 114) before the contents of register window 113 can be restored to the active register 120. Therefore, the contents in the active register 120 must be swapped (i.e., a save operation to register window 114 and a restore operation from register window 113).

FIG. 1B shows a timing diagram 150 of the pipeline 100. A clock 152 signal controls the timing of the various operations. When a swap request occurs, then in a first clock cycle the data from active window 120 is saved to the appropriate register window (e.g., register window 114) and then next cycle next cycle the content from the desired register window (register window 113) is restored to the active window 120.

The swap requests typically operate in an acceptable manner as long as the swap requests do not occur too often. However, multiple swap requests often occur immediately following one another. As a result, the pipeline can stall. By way of example, if a first swap request (i.e., swap A) is received, then a save A operation 120A occurs, followed by a restore A operation 120B, in the next clock cycle. A second swap request (swap B 122) is received immediately after the swap A request is received. However, two clock cycles are required to complete the save A 120A and restore A 120B operations required for the swap A request, therefore the swap B request 122 must be delayed two clock cycles before the swap B request can be acted upon in respective save B operation 122A and restore B operation 122B. As a result, the swap B request 122 has a latency of 2 (two clock cycles between when swap B request was received and when restore B operation 122B was completed). If a swap C request 124 immediately followed the swap B request 122 (i.e., during the third clock cycle), then the swap C request would have a latency of 4 (i.e. four clock cycles between when the sway C request was received and when the respective save C operation 124A and subsequent restore C operation 124B was completed). Further, for an nth subsequent swap request 126 each swap request would have a n+1 latency factor. By way of example a tenth consecutive swap request (swap J) would have a latency of 11 (i.e., 11 clock cycles would pass between when the swap J request 126 was received and when the respective save J operation 126A and subsequent restore J operation 126B was completed). The latencies cause pipeline stalls where processing is delayed for that number of clock cycles.

In view of the foregoing, there is a need for a system and method for minimizing the number of stall cycles caused by multiple, subsequent swap requests.

SUMMARY OF THE INVENTION

Broadly speaking, the present invention fills these needs by providing an improved system and method for managing swap requests in a microprocessor pipeline. It should be appreciated that the present invention can be implemented in numerous ways, including as a process, an apparatus, a system, computer readable media, or a device. Several inventive embodiments of the present invention are described below.

One embodiment includes a method of processing multiple swap requests including receiving a first swap request in a pipeline and executing the first swap request. A second swap request is also received in the pipeline immediately following the first swap request. The first swap request and the second swap request are examined to determine if the first swap request and the second swap request swap a same register.

The second swap request can be executed if the first swap request and the second swap request do not swap the same register. The first swap request includes a first save operation and a first restore operation and the second swap request includes a second save operation and a second restore operation. Executing the second swap request if the first swap request and the second swap request do not swap the same register can include executing the first restore operation and the second save operation substantially simultaneously.

The method can also include delaying execution of the second swap request if the first swap request and the second swap request swap the same register and executing the second swap request. The execution of the second swap request can be delayed sufficient to allow the execution of the first swap request to be completed. The execution of the second swap request can be delayed a predetermined number of clock cycles such as one clock cycle.

The pipeline can include more than one processing thread. The same register can include the same register in a same processing thread. The determining if the first swap request and the second swap request swap the same register can occur as the second swap request is received.

Another embodiment includes a method for processing multiple, consecutive swap requests in a multithreaded microprocessor pipeline includes receiving a first swap request in a pipeline and executing the first swap request. A second swap request is received in the pipeline and the first swap request and the second swap request are examined to determine if the first swap request and the second swap request swap a same register in a same processing thread. The second swap request is executed if the first swap request and the second swap request do not swap the same register.

If the first swap request and the second swap request do swap the same register, then the execution of the second swap request is delayed at least one clock cycle and the second swap request is executed.

Another embodiment includes a pipeline architecture for a processing thread. The pipeline architecture includes multiple pipeline registers, at least one of the pipeline registers being capable of comparing a first swap request and a second swap request and multiple active registers.

The multiple pipeline registers includes at least eight pipeline registers. The at least eight pipeline registers are linked to one of the active registers. The multiple pipeline registers includes 32 pipeline registers. The pipeline architecture can also be one of at least two pipeline architectures in a single, multithreaded microprocessor.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments for an improved system and method for managing swap requests in a microprocessor pipeline will now be described. It will be apparent to those skilled in the art that the present invention may be practiced without some or all of the specific details set forth herein.

As described above multiple subsequent swap requests can cause significant pipeline stalls. These pipeline stalls are processing times in which the processor is not processing and therefore directly impacts the processing throughput.

One embodiment substantially eliminates the wait time for all subsequent swap requests. Each swap request needs to be dispatched immediately. In order to dispatch each swap request immediately, an internal pipeline in the decoder is implemented to hold the dispatched request. Subsequent requests are served/dispatched immediately. To avoid conflict back-to-back swap requests cannot address the same register entry. In this manner, the simultaneous swap operation on different register entries. By way of example, while a restore operation is running on register (e.g., r<7>), a save operation is running on another register (e.g., r<8>).

One embodiment compares each subsequent swap request with the preceding swap request. If the subsequent swap request is not the same as the preceding swap request then the subsequent swap request is executed immediately. If the subsequent swap request is the same as the preceding swap request then the subsequent swap request is delayed until the preceding swap request has completed.

In one embodiment, to avoid a potentially lengthy n+1 stall cycles, a single stall cycle is automatically inserted after every swap request respectively. Inserting the single stall cycle after every swap request provides a more predictable delay but the end result of multiple, subsequent swap requests is approximately the same.

Figure 1A:
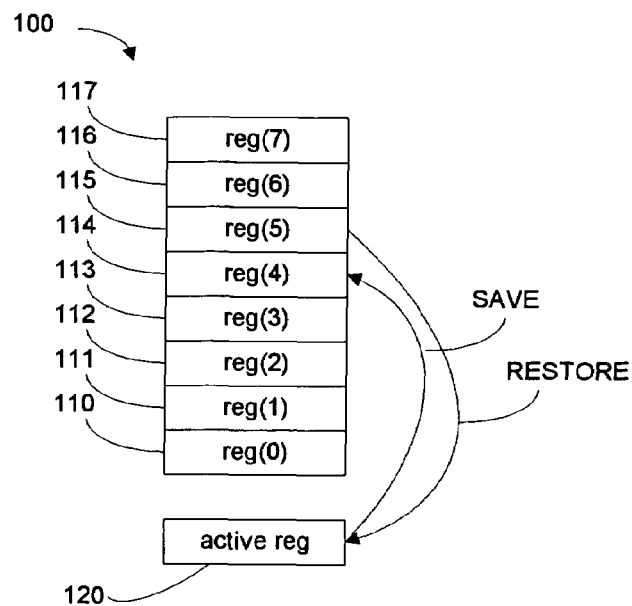
FIG. 1A shows a typical prior art processing window used by a pipeline processor.
Figure 1B:
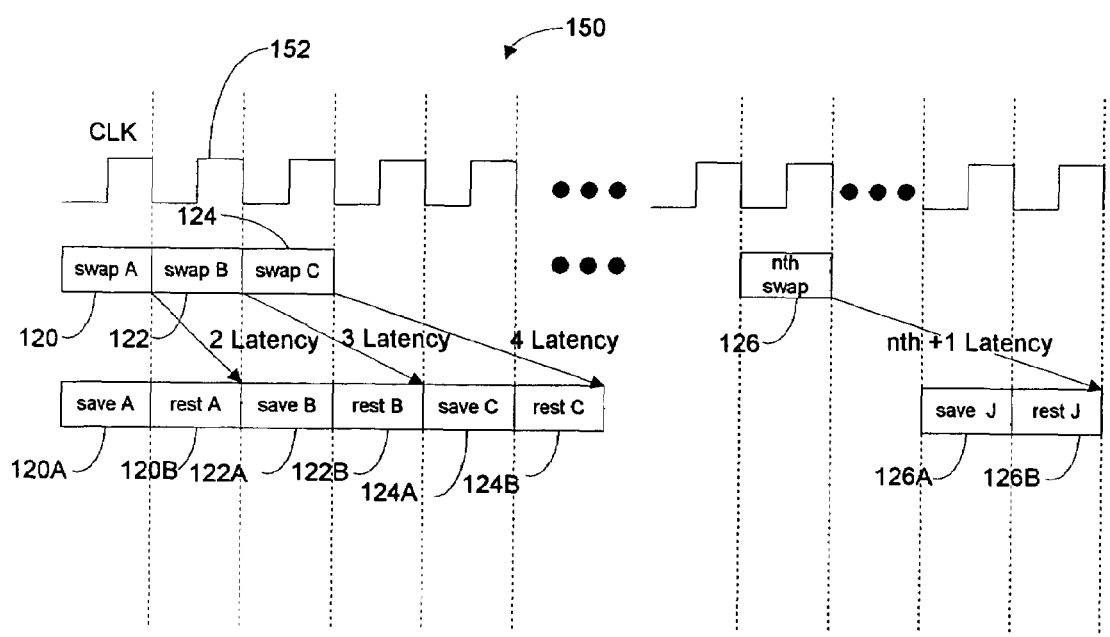
FIG. 1B shows a timing diagram of the pipeline.
Figure 2A:
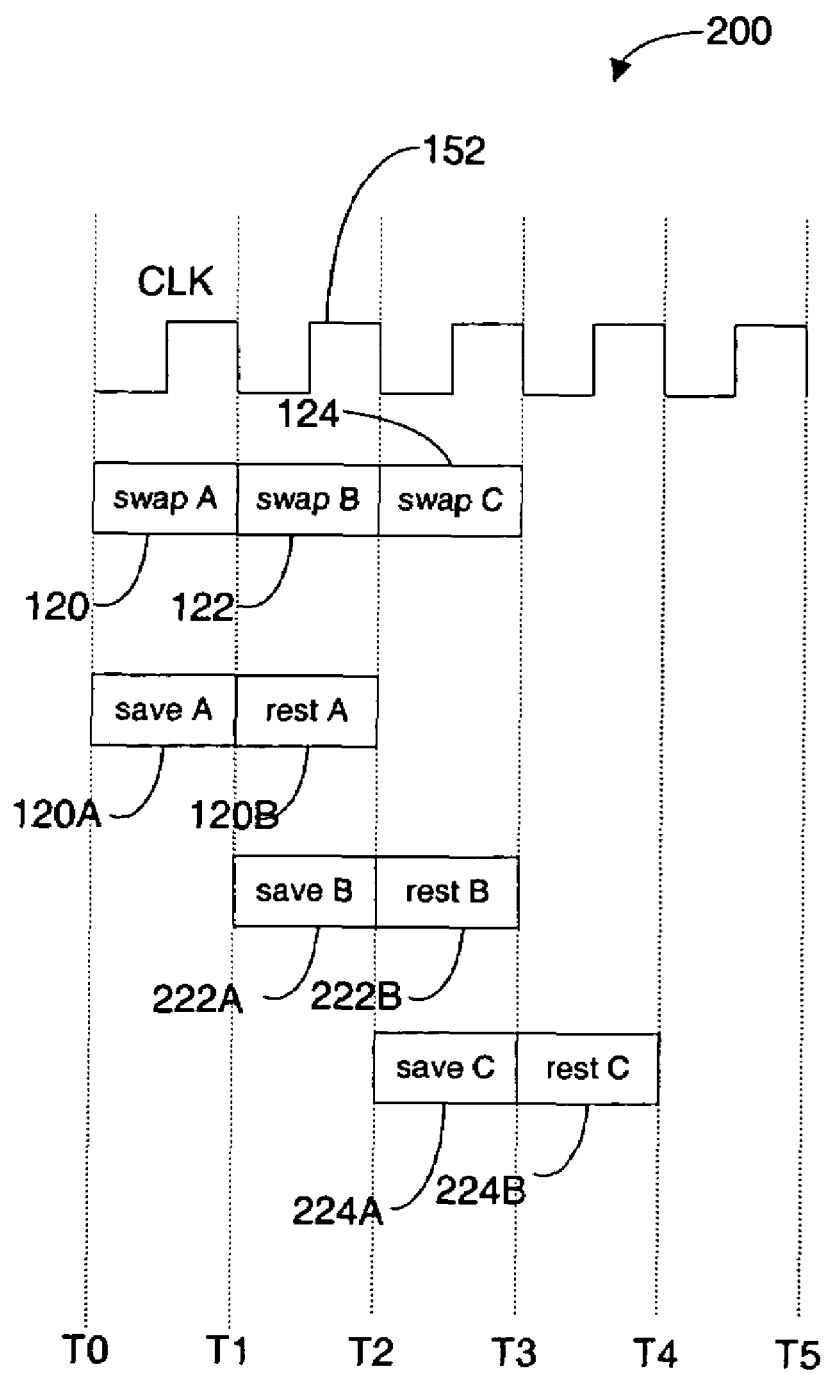
FIG. 2A is a timing diagram of multiple swap requests, in accordance with one embodiment of the resent invention.
Figure 2B:
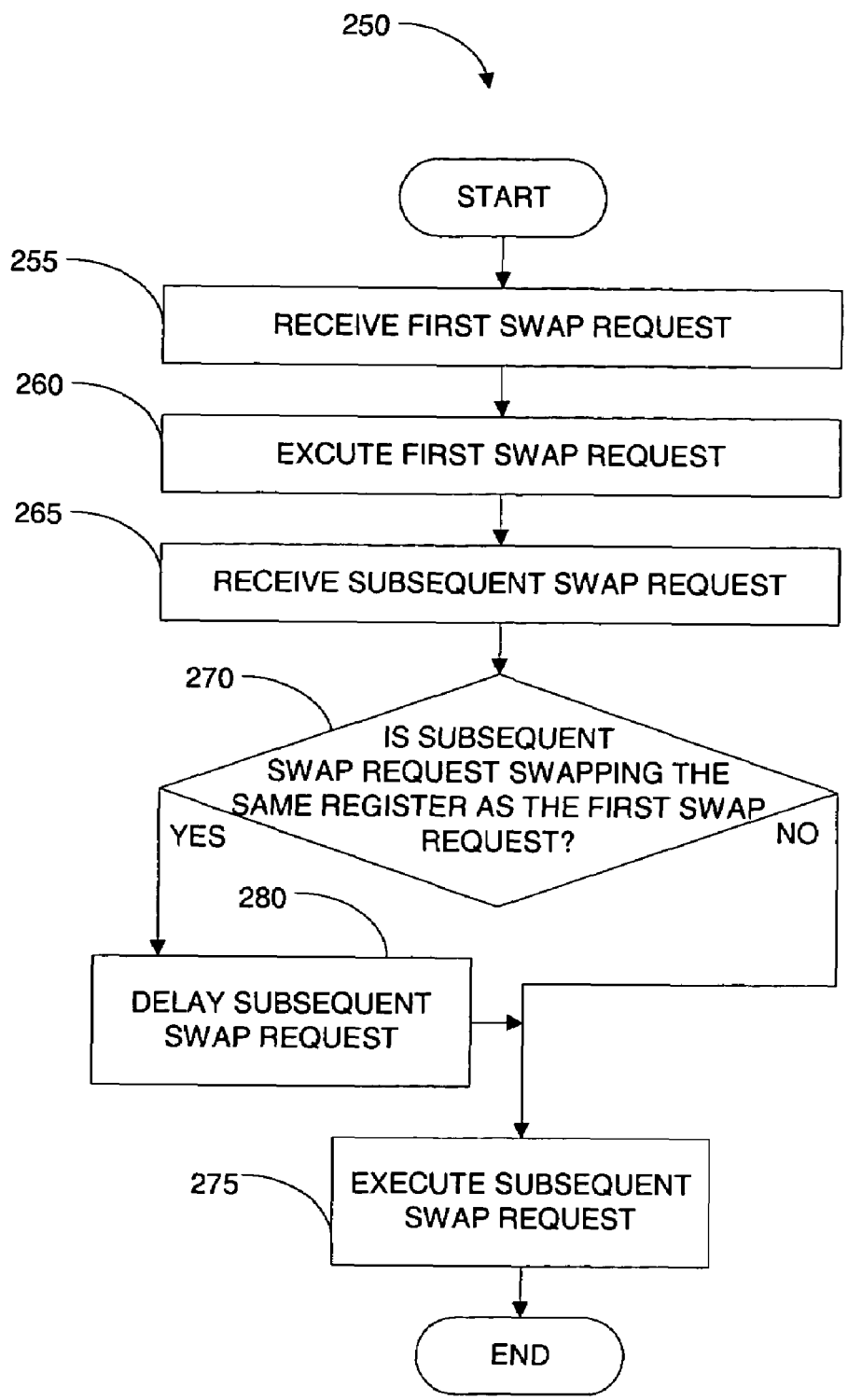
FIG. 2B is a flowchart diagram that illustrates the method operations performed in comparing multiple subsequent swap requests in accordance with one embodiment of the present invention.

FIG. 2A is a timing diagram 200 of multiple swap requests, in accordance with one embodiment of the resent invention. FIG. 2B is a flowchart diagram 250 that illustrates the method operations performed in comparing multiple subsequent swap requests in accordance with one embodiment of the present invention. In an operation 255, a first swap request (e.g., swap A 120) is received at time T0. In operation 260, the first swap request 120 is executed at time T0. When the first swap request 120 is executed, the save A operation 120A is executed during the first clock cycle and the restore A 120B is executed during the second clock cycle (i.e., between time T1 and time T2).

In an operation 265, a subsequent swap request (swap B 122) is received at time T1, at the beginning of the second clock cycle, substantially simultaneously as the restore A 120B is being executed. In an operation 270, the subsequent swap request (swap B 122) is compared to the first swap request (swap A 120). The subsequent swap request 122 can be compared to the first swap request 120 as the subsequent swap request is received in operation 265 above.

If in operation 270, the subsequent swap request 122 is not swapping the same register as the first swap request 120 then the method operations continue in operation 275. If in operation 270, the subsequent swap request 122 is swapping the same register as the first swap request 120, then the method operations continue in operation 280.

In an operation 275, the subsequent swap request 122 is executed at a time T1. When the second swap request 122 is executed, the save B operation 222A is executed during the second clock cycle and the restore B 222B is executed during the third clock cycle (i.e., between time T2 and time T1). As a result, the save B operation 222A is executed substantially simultaneously as the restore A operation 120B is executed. The method operations then end.

In an operation 280, a delay is inserted because both of the first swap 120 and the second swap 122 are attempting to swap the same register (e.g., i<5>). By way of example, a one clock cycle delay is inserted so that the subsequent swap 122 is executed after the first swap 120 instruction is completed such as when swap C 124 is executed (i.e. save C operation 114A and restore C operation 114B are completed between times T2 and T4) as shown in FIG. 2A. The delay is inserted to avoid a "collision" at the same register because two instructions would be attempting to access the same register at the same time. It should be understood that the delay can also be more than one clock cycle. The method operations then continue as described in operation 275 above except delayed by one clock cycle. Additional registers can be needed to carryout the method operations described in FIGS. 2A and 2B.

Figure 3:
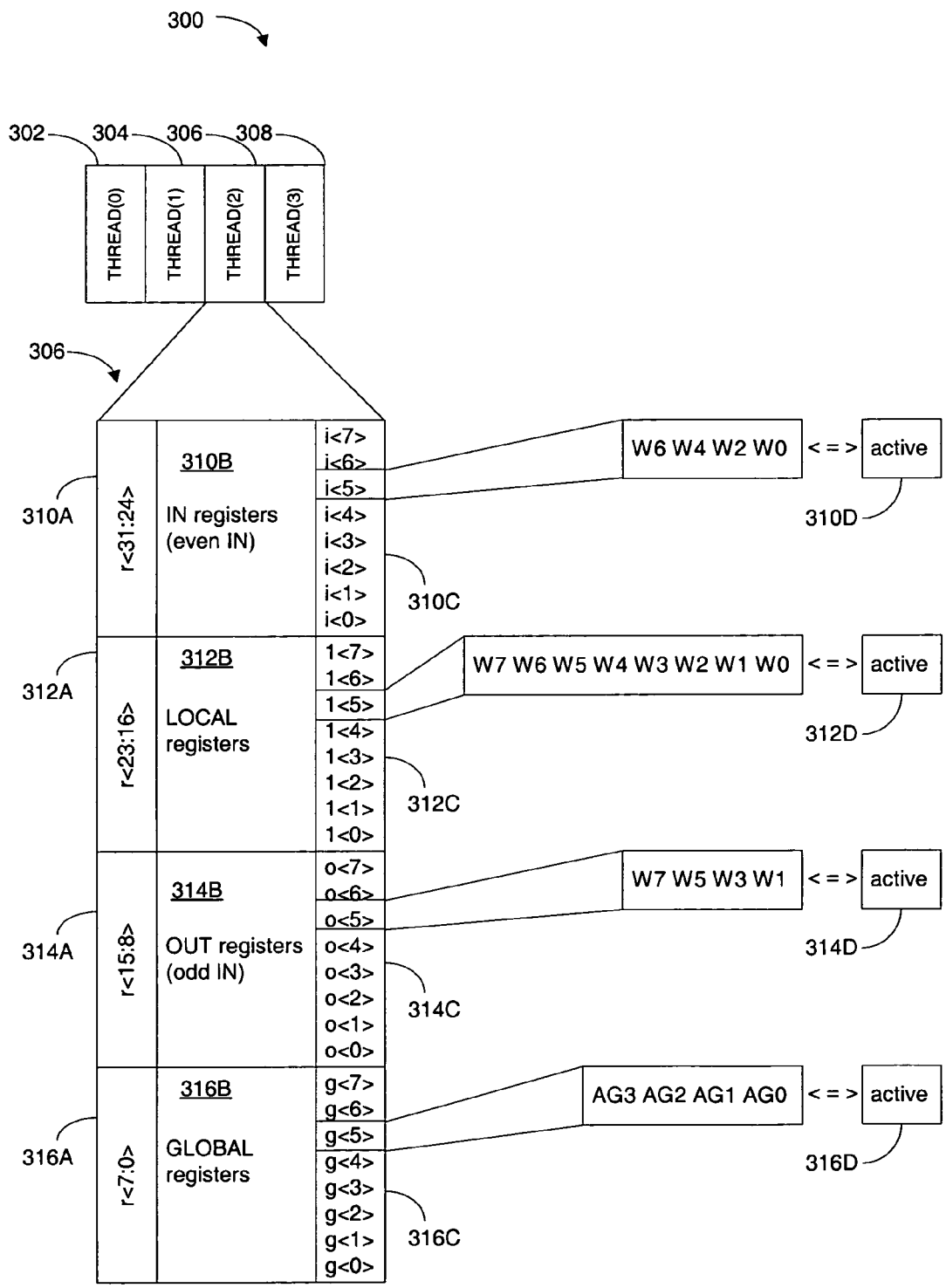
FIG. 3 is a pipeline in accordance with one embodiment of the present invention.

FIG. 3 is a pipeline 306 in accordance with one embodiment of the present invention. The pipeline 306 includes multiple registers i<0>-i<7>, l<0>-l<7>, o<0>-o<7> and g<0>-g<7>. Multiple active registers 310D-316D are also included. As described above, a swap request will swap the contents of the active register out (i.e., a save operation) to one of the pipeline registers and transfer the contents of one of the pipeline registers into the active register (i.e., a restore operation). The pipeline 306 also includes a least one registers that can be used for comparing two consecutive swap requests as described above.

In one embodiment, the multiple registers include at least eight registers (e.g., 32) or even more. The multiple registers are divided into subsets (e.g. 4 subsets of 8 registers for a total of 32 registers). Each of the subsets of registers are linked to one of the active registers. The processing that occurs is applied to the contents of the active register. The pipeline 306 can also be one thread (e.g., thread(2)) of a single multithreaded 302, 304, 306, 308 microprocessor 300. It should be understood that less or more than 32 registers can also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIG. 2B are not required to be performed in the order illustrated, and that all the processing represented by the operations may not be necessary to practice the invention. Further, the processes described in FIG. 2B can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing a plurality of swap requests comprising:

receiving a first swap request in a pipeline in a first clock cycle, wherein the first swap request requests swapping active contents of a active register window with a first contents from a first register;

executing the first swap request including:

executing a first save operation in the first clock cycle, wherein the active contents of the active register window is saved to a corresponding register; and executing a first restore operation in a second clock cycle, wherein the second clock cycle immediately follows the first clock cycle, wherein the first contents of the first register are restored to the active register window;

receiving a second swap request in the pipeline in the second clock cycle, wherein the second swap request requests swapping the first contents in the active register window with a second contents from a second register;

determining if the first register is a same register as the second register; and executing the second swap request if the first swap request and the second swap request do not swap the same register, wherein executing the second swap request includes:

executing a second save operation in the second clock cycle, wherein the first contents of the active register window is saved to first register at substantially simultaneously with the executing the first restore operation; and executing a second restore operation in a third clock cycle, wherein the third clock cycle immediately follows the second clock cycle, wherein the second contents of the second register are restored to the active register window, wherein the first swap request and the second swap request have a constant latency.

2. The method of claim 1, further comprising:

delaying execution of the second swap request if the first register is the same register as the second register; and executing the second swap request.

3. The method of claim 2, wherein the execution of the second swap request is delayed sufficiently to allow the execution of the first swap request to be completed.

4. The method of claim 2, wherein the execution of the second swap request is delayed a predetermined number of clock cycles.

5. The method of claim 2, wherein the execution of the second swap request is delayed one clock cycle.

6. The method of claim 1, wherein the pipeline includes more than one processing thread.

7. The method of claim 6, wherein determining if the first register is the same register as the second register includes determining if the first register in the corresponding processing thread is the same register as the second register in the corresponding processing thread.

8. The method of claim 1, wherein determining if the first register is the same register as the second register occurs as the second swap request is received.

9. A method for processing a plurality of consecutive swap requests in a multithreaded microprocessor pipeline comprising:

receiving a first swap request in a pipeline in a first clock cycle, wherein the first swap request requests swapping active contents of a active register window with a first contents from a first register;

executing the first swap request including:

executing a first save operation in the first clock cycle, wherein the active contents of the active register window is saved to corresponding register; and executing a first restore operation in a second clock cycle, wherein the second clock cycle immediately follows the first clock cycle, wherein the first contents of the first register are restored to the active register window;

receiving a second swap request in the pipeline in the second clock cycle, wherein the second swap request requests swapping the first contents in the active register window with a second contents from a second register;

determining if the first register in the corresponding processing thread is a same register as the second register in the corresponding processing thread; and executing the second swap request if the first swap request and the second swap request do not swap the same register, wherein executing the second swap request includes:

executing a second save operation in the second clock cycle, wherein the first contents of the active register window is saved to first register at substantially simultaneously with the executing the first restore operation; and executing a second restore operation in a third clock cycle; wherein the third clock cycle immediately follows the second clock cycle, wherein the second contents of the second register are restored to the active register window, wherein the first swap request and the second swap request have a constant latency.

10. The method of claim 9, further comprising:

delaying execution of the second swap request at least one clock cycle if the first register in the corresponding processing thread is the same register as the second register in the corresponding processing; and executing the second swap request.

11. A pipeline architecture for a processing thread comprising:

a plurality of pipeline registers, at least one of the plurality of pipeline registers being capable of comparing a first swap request and a second swap request;

a plurality of active registers;

logic for receiving a first swap request in the pipeline in a first clock cycle, wherein the first swap request requests swapping active contents of a first active register window of the plurality of active register windows in the pipeline with a first contents from a first register;

logic for executing the first swap request including:

executing a first save operation in the first clock cycle, wherein the active contents of the first active register window is saved to corresponding register; and executing a first restore operation in a second clock cycle, wherein the second clock cycle immediately follows the first clock cycle, wherein the first contents of the first register are restored to the first active register window;

logic for receiving a second swap request in the pipeline in the second clock cycle, wherein the second swap request requests swapping the first contents in the first active register window with a second contents from a second register;

logic for determining if the first register is a same register as the second register; and logic for executing the second swap request if the first swap request and the second swap request do not swap the same register, wherein executing the second swap request includes:

executing a second save operation in the second clock cycle, wherein the first contents of the active register window is saved to first register at substantially simultaneously with the executing the first restore operation; and executing a second restore operation in a third clock cycle, wherein the third clock cycle immediately follows the second clock cycle, wherein the second contents of the second register are restored to the active register window, wherein the first swap request and the second swap request have a constant latency.

12. The pipeline architecture of claim 11, wherein the plurality of pipeline registers includes at least eight pipeline registers, and wherein the at least eight pipeline registers are linked to one of the plurality of active registers.

13. The pipeline architecture of claim 11, wherein the plurality of pipeline registers includes 32 pipeline registers.

14. The pipeline architecture of claim 11, wherein the pipeline architecture is one of at least two pipeline architectures in a single multithreaded microprocessor.

* * * * *